United States Patent Office 3,483,165
Patented Dec. 9, 1969

3,483,165
PROCESS FOR POLYMERISING TRIOXANE
Ernst-Ulrich Kocher, Wolfgang von der Emden, Heinrich Glaser, and Hans Holtschmidt, Leverkusen, Germany, assignors to Farbenfabriken Bayer Aktiengesellschaft, Leverkusen, Germany, a corporation of Germany
No Drawing. Filed Oct. 18, 1967, Ser. No. 676,041
Claims priority, application Germany, Dec. 2, 1966, F 50,824
Int. Cl. C08g 1/12, 1/04
U.S. Cl. 260—67      3 Claims

ABSTRACT OF THE DISCLOSURE

Process for polymerising or copolymerising trioxane in bulk, suspension or solution wherein 0.01 to 1% by weight, based on the weight of monomers present, of an ester of thiodipropionic acid is present during polymerisation for the purpose of preventing the formation of peroxides and decomposition products thereof.

---

It is known to polymerise and copolymerise trioxane with different types of monomers. This polymerisation or copolymerisation can, for example, be carried out as bulk polymerisation, which takes place within an extremely short time with an almost quantitative yield. For this purpose, generally a polymerisation catalyst is melted with the trioxane and simultaneously the comonomer is added. The trioxane and the comonomer can however be melted together and the catalyst can optionally be added in dissolved form. It is also possible for such polymerisation reactions to be carried out in suspension in an organic suspending agent in which the trioxane has only limited solubility. Suitable suspending agents are, for example, straight-chain aliphatic hydrocarbons with more than 8 carbon atoms, or mixtures thereof.

The polymerisation or copolymerisation can also be carried out in solution, in e.g. benzene, toluene, hexane, heptane, cyclohexane, chlorinated hydrocarbons or hydrogenated oligomers of isobutylene as organic solvents. Generally, cationically-active catalysts are used as polymerisation catalysts, for example Friedel-Crafts catalysts or Lewis acids. Examples of such catalysts include: Sulphuric acid, perchloric acid, aliphatic and aromatic sulphonic acids and such Lewis acids as boron trifluoride, boron trichloride, aluminium trichloride, stannous chloride or addition compounds of the boron halides with ethers, carboxylates, carboxylic acid anhydrides or amines. As comonomers for this polymerisation, there have been used compounds with olefinic groups, cyclic ethers and acetals, cyclic thioethers and thioacetals as well as N-sulphonyl heterocyclic compounds.

A few groups of copolymers will hereinafter be mentioned:

(1) Cyclic ethers of the general formula

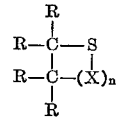

wherein $R_1$ and $R_2$ each represents hydrogen or a lower alkyl radical or lower haloalkyl radical and $R_3$ represents equal or different methylene, oxymethylene, alkyl- or haloalkyl-substituted methylene or lower alkyl- or haloalkyl-substituted oxymethylene radicals and $n$ represents a number from 1 to 3. Such compounds are described as trioxane comonomers in U.S. patent specification No. 3,027,352.

Polyalkyl glycol formals, such as diethylene and triethylene glycol formal, are examples of such compounds.

(2) Cyclic thioethers of the general formula

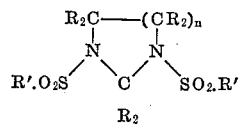

wherein each R represents a hydrogen atom or a lower alkyl radical or lower haloalkyl radical, X represents a methylene, methyleneether or methylenethioether radical and $n$ is an integer from 0 to 3, the ring system containing only —C—S— or —C—O— bonds apart from —C—C— bonds. These compounds are described in German Auslegeschrift No. 1,176,862 as a comonomers for trioxane polymerisation.

(3) Nitrogen heterocyclic compounds of the general formula

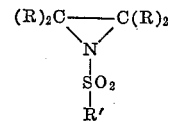

wherein each R represents hydrogen, a lower alkyl radical or a lower haloalkyl radical, R' represents an alkyl, aryl, aralkyl or alkaryl radical with up to 20 carbon atoms and $n$ represents an integer from 1 to 3. These compounds are described in German patent specification No. 1,218,154, as comonomers for trioxane polymerisation.

(4) Silicon-containing comonomers, which are described in Belgian patent specification No. 679,425.

(5) Nitrogenous cyclic comonomers of the general formula

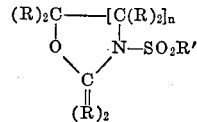

wherein each R represents hydrogen or a lower alkyl radical, and R' represents an alkyl, aryl, aralkyl or alkaryl radical, it being possible for the number of carbon atoms to be up to 20 (cf. German Auslegeschrift 1,231,009) or nitrogenous cyclic comonomers of the general formula $$(R)_2C\!\!-\!\![C(R)_2]_n$$
$$|\qquad\qquad|$$
$$O\qquad N\!\!-\!\!SO_2R'$$
$$\diagdown\!\!C\!\!\diagup$$
$$\|$$
$$(R)_2$$

wherein R represents hydrogen, a lower alkyl radical or a lower haloalkyl radical, R' represents an alkyl, aryl, aralkyl or alkaryl radical, it being possible for the number of carbon atoms to be up to 20 and $n$ represents an integer from 1 to 3.

(6) Comonomers with vinyl or vinylidene groups, e.g. styrene, vinyl acetate, acrylonitrile, vinyl ethyl ether or derivatives of acrylic acid, such as acrylamide and methacrylamide.

Trioxane and also many of these comonomers have a great tendency to form peroxides. With trioxane, this tendency is very strongly pronounced in the liquid or gaseous state. With the decomposition of such peroxides, cleavage products are formed which inhibit the polymerisation by chain break off. An example of a cleavage product is formic acid which is an autoxidation product of trioxane. Peroxides or their decomposition products impair the properties of the polymers and often only low molecular weight products are formed.

The formation of peroxides can be avoided by polymerising with careful exclusion of air or oxygen. However, this procedure involves a high technical expense and labour cost and its reliability is fundamentally dependent on the reliability of the equipment and the care with which it is operated.

Another method of preventing the formation of peroxides or secondary products is the use of anti-oxidants. This has hitherto not been proposed in the polymerisation of formaldehyde or trioxane, because known anti-oxidants always contain groups which disturb or inhibit this polymerisation. Thus, phenolic groups are chain break off agents in the same way as ester groups; amino compounds inhibit the cationic polymerisation because of their basic nature; and sulphur compounds, e.g. thioethers, retard or prevent the polymerisation.

It has now been found that it is not necessary to work in the absence of air if the polymerisation or copolymerisation of trioxane is carried out in the presence of small quantities of an ester of thiopropionic acid. Object of this invention thus is a process for the polymerisation or copolymerisation of trioxane wherein said polymerisation is carried out in the presence of an ester of thiopropionic acid.

Even small quantities of these esters are sufficient for effectively preventing the formation of peroxides, and generally 0.01 to 1% by weight, based on the quantity of trioxane, is used. Larger quantities can also be employed, but no great advantage results from this.

Suitable esters of thiopropionic acid are, for example, compounds of the general formula

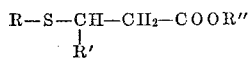

wherein R represents an alkyl or aryl radical, which optionally can be substituted, for example, with alkyl or halogen, advantageously alkyl with 1 to 6 carbon atoms, phenyl or naphthyl or the radical

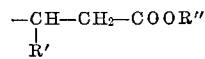

wherein R' is advantageously hydrogen or a lower alkyl, R'' is alkyl or aryl, which optionally can be substituted with alkyl or halogen, advantageously alkyl with 4 to 20 carbon atoms.

Particularly preferred are the dialkyl esters of thiodipropionic acid, preference being given to alkyl radicals with 4 to 20 carbon atoms.

Examples of such compounds are dilauryl thiodipropionate didodecyl thiodipropionate, distearyl thiodipropionate, diphenylthiodipropionate, dodecyl 2-thiophenylpropionate and n-butyl 2-thiododecylpropionate.

The polymerisation process is carried out by the known methods of trioxane polymerisation (as e.g. described in the references given with the enumeration of comonomers and the reference given in these references), the ester of thiodipropionic acid being supplied at any desired step in the process before initiation of the polymerisation. These esters can also be added to the trioxane or to the comonomer or to the solvent, if any. By the addition of an ester of thiopropionic acid, the progress of the trioxane polymerisation is not disturbed; there is merely sometimes a slight slowing down of the polymerisation. Simultaneously, the anti-oxidation effect of these compounds is fully effective.

The products—trioxane polymers and copolymers—may be used in known manner as thermoplastic moulding compositions.

EXAMPLE 325 g. of trioxane, 425 ml. of cyclohexane and 200 mg. of dilaurylthiodipropionate were dehydrated by distillation. After adding 15 g. of bis-methanesulphonyl imidazolidine, the polymerisation was initiated by adding 100 mg. of boron trifluoride-dibutyl etherate at 70° C. After completing polymerisation, the mixture was suction filtered, washed with methanol and dried. The polymer had an intrinsic viscosity N'=2.02, measured at 60° C. in p-chlorophenol. Low molecular weight fractions could not be detected in the polymer.

A comparative test in the absence of an ester of thiodipropionic acid yielded a product with an intrinsic viscosity of 1.62, with a yield lower by 13% and a proportion of about 10% of low molecular weight polymer.

We claim:
1. In a process for polymerising trioxane or copolymerising trioxane with copolymerizable monomers selected from the group consisting of heterocyclic oxygen-, nitrogen- or sulfur-containing compounds, silicon-containing compounds and olefinically unsaturated compounds in bulk, suspension or solution, the improvement which comprises effecting said polymerisation in the presence of 0.01 to 1% by weight, based on the weight of the monomers, of an alkyl or aryl ester of thiodipropionic acid.

2. Improved process according to claim 1 wherein the ester of thiodipropionic acid is an alkyl ester of thiodipropionic acid.

3. Improved process according to claim 1 wherein the ester of thiopropionic acid is dilaurylthiodipropionate.

References Cited

UNITED STATES PATENTS

| | | | |
|---|---|---|---|
| 3,170,896 | 2/1965 | Wagner et al. | 260—67 |
| 3,219,630 | 11/1965 | Sidi | 260—67 |
| 3,235,624 | 2/1966 | Green | 260—857 |
| 3,255,150 | 6/1966 | Green | 260—45.8 |
| 3,277,044 | 10/1966 | Weissermel et al. | 260—45.8 |

WILLIAM H. SHORT, Primary Examiner

L. M. PAYNES, Assistant Examiner

U.S. Cl. X.R.

260—67.5, 45.7, 72, 73